3,794,703
PROCESS FOR THE PURIFICATION OF DIALKYL PHOSPHOROCHLORIDOTHIONATES
Thomas M. Beck, Hastings-on-Hudson, Richard J. Eletto, White Plains, and Donald J. Martin, Irvington, N.Y., assignors to Stauffer Chemical Company, New York, N.Y.
No Drawing. Filed Dec. 22, 1969, Ser. No. 887,407
Int. Cl. C07f 9/14
U.S. Cl. 260—990          8 Claims

ABSTRACT OF THE DISCLOSURE

The present invention provides a process for the purification of dialkyl phosphorochloridothionates. The process comprises adding a dialkyl phosphorodithioic acid to a dialkyl phosphorochloridothionate solution containing impurities in a sufficient amount to react with at least one of the impurities to form the dialkyl phosphorochloridothionate, and separating the phosphorochloridothionate in a substantially pure state from the remaining impurities in solution.

---

This invention relates to the purification of dialkyl phosphorochloridothionates. More particularly, this invention relates to a process wherein a sufficient amount of dialkyl phosphorodithioic acid is admixed with a dialkyl phosphorochloridothionate solution containing impurities to react with at least one of said impurities to form the phosphorochloridothionate and then separating and removing the dialkyl phosphorochloridothionate from the remaining impurities.

The dialkyl phosphorochloridothionates of the present invention have the structure:

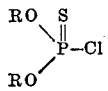

wherein the R's are like alkyl hydrocarbon radicals. The phosphorochloridothionates are valuable as intermediates in the manufacture of pesticidal agents, flotation agents, plasticizers, lubricating oils additives and many other useful chemicals.

Various processes are and have been utilized for the production of phosphorochloridothionates of the foregoing structure and commercially they are obtained by chlorinating either (1) a bis(thiophosphono)sulfide of the structure:

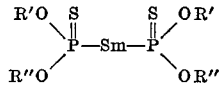

wherein m is a whole number, but usually 2; or (2) a dithiophosphoro compound of the structure:

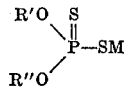

wherein M is hydrogen or an alkali metal, e.g., sodium or potassium. The chlorinating agent being chlorine, sulfur dichloride, sulfur monochloride or sulfury chloride.

In the chlorination of such compounds there are by-products or impurities from which the desired product must be separated. On method has been by fractional distillation of the desired product, and another method by solvent extraction of the dialkyl phosphorochloridothionate with an organic solvent. However, such methods have not been found entirely satisfactory from a commercial standpoint because of the close proximity of boiling points and similar solubility characteristics. A complete or near complete separation of the desired products from the impurities by these techniques is not possible unless repeated several times and at a great expense and loss of some of the product yield.

In a more recent process, there is provided a means of purifying or improving the quality of the crude distilled phosphorochloridothionates which comprises the contacting of the phosphorochloridothionate with water and thereafter separating the organic phase. The distilled phosphorochloridothionate is contacted with water for as long a period as needed to purify the crude distilled phosphorochloridothionate. In this process, however, the percentage of yield of the desired product, i.e. the dialkyl phosphorochloridothionate, is reduced in that a portion of the desired product is destroyed or lost by the washing with water and the interaction of the water with the product. Also, an additional step is required to separate the organic phase of the desired product.

There is a need for a process of purifying and separating the dialkyl phosphorochloridothionates in a good yield without any loss or damage of the desired product. This need is satisfied by the present invention which provides a substantially pure product without an additional step.

According to the present invention, a process is provided for the purification of dialkyl phosphorochloridothionates. The process comprises contacting and mixing a dialkyl phosphorodithioic acid in a sufficient amount with a phosphorochloridothionate solution containing impurities to react with at least one of the impurities to form the dialkyl phosphorochloridothionate, which is removed from the solution. In the process, the dialkyl phosphorodithioic acid is added to the dialkyl phosphorochloridothionate solution, and mixed for a period of at least one minute at a temperature of about 10° C. to 80° C.

In the present process, it is preferable to use the dialkyl phosphorodithioic acid corresponding to the thionate being produced.

The dialkyl phosphorochloridothionate purified according to the present process may be produced in a two-step process as described below.

In the first step, an alkyl alcohol is treated with a phosphorus sulfur compound to produce a dialkyl phosphorodithioic acid as shown by the equation:

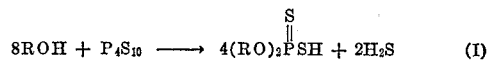

wherein R is an alkyl hydrocarbon containing from 1 to 12 carbon atoms. The dialkyl phosphorodithioic acid is diffcult to purify and is directly chlorinated as a crude reaction product. The chlorination is shown by the following equation:

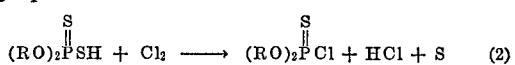

wherein R is an alkyl hydrocarbon radical consisting of 1 to 12 carbon atoms.

As can be seen by the Equation 2, above, the chlorinated product is in a mixture that contains the impurities sulfur and hydrochloric acid. In addition, there may be other impurities including sulfur chlorides,

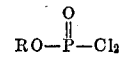

and

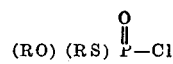

from which the desired product, i.e., the dialkyl phosphorochloridothionate, is to be separated and removed.

According to the present invention, an excess of the dialkyl phosphorodithioic acid, i.e. e.,

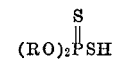

is preferably produced from Equation 1 which is added and mixed with the product of Equation 2, i.e., the dialkyl phosphorochloridothionate. A sufficient amount of the thioic acid is added to react with at least one of the difficult to separate impurities to form an additional amount of the dialkyl phosphorochloridothionate.

The existing phosphorochloridothionate together with the newly formed thionate in solution is then separated and removed from the other impurities contained therein in a substantially pure state by suitable means such as distillation.

According to the present invention, the phosphorochloridothionate solution with which the thioic acid is admixed may be distilled or undistilled material. A substantially pure dialkyl phosphorochloridothionate is obtained in either case.

Although it is preferred that the corresponding acid is used to purify the dialkyl phosphorochloridothionate, other dialkyl phosphorodithioic acids such as dimethyl, dipropyl, diethyl, dibutyl, and dihexyl may be used in the present process. Generally, the phosphordithioic acid is added to the thionate solution in the amount of about 1 to 20%. Accordingly, for a phosphorochloridothionate solution of 100 grams, between 1 and 20 grams of thioic acid is added, depending upon the amount of impurities contained in the solution.

The length of time in which the dithioic acid is admixed with the chlorinated product, depends greatly on the amount of impurities present in the solution. Generally, a period of about 1 minute to 1 hour will suffice to have the thioic acid react with at least one of the impurities to form an additional amount of the dialkyl phosphorochloridothionate.

The addition of the thioic acid may be at room temperature, however, it can be mixed at a temperature of 10° C. to 80° C., and preferably about 40° C. to 60° C.

The present process as described above may be used in the purification of any of the dialkyl phosphorochloridothionates, including dimethyl, diethyl, dipropyl, dibutyl, dihexyl, and the like.

The following examples will give a more complete understanding of the present invention and its advantages.

EXAMPLE 1

Two 140 gram samples of identical compositions, each of undistilled chlorinated dimethyl phosphorothioic acid were prepared. To one of the samples there was added 14 grams of dimethyl phosphorothioic acid (DMPTA), and none to the other sample. Both the samples were heated at 50° C. for 30 minutes, and then distilled at a pressure of 1 millimeter and the distillates were analyzed as follows:

|  | DMPTA | No DMPTA |
|---|---|---|
| Mole percent of components: | | |
| $CH_3OP(O)Cl_2$ | 0.82 | 1.20 |
| $S_2Cl_2$ | Nil | Nil |
| $(CH_3O)_2PSCl$ | 99.15 | 97.85 |
| $(CH_3O)(CH_3S)POCL$ | 0.03 | 1.15 |

The analysis shows that with the use of the thioic acid, a purer product, i.e., the phosphorochloridothionate, is obtained than where there is no thioic acid.

EXAMPLE 2

Three samples were prepared as in Example 1 above, and to one sample there was added 10% of dimethyl phosphorothioic acid (DMPTA) and this was heated for a period of ½ hour at 50° C. No thioic acid was added to the second sample which was heated to 50° C. for a period of ½ hour. The third sample was neither heated nor had any DMPTA added thereto. The three samples were distilled under reduced pressure and analyzed as follows:

|  | DMPTA added and heated | Heated | Untreated |
|---|---|---|---|
| Mole percent of components: | | | |
| $CH_3OP(O)Cl_2$ | 0.82 | 1.34 | 1.64 |
| $S_2Cl_2$ | Nil | Nil | Nil |
| $CH_3(O)(CH_3S)POCl$ | 0.03 | 0.65 | 1.27 |
| Purity | 99.15 | 98.1 | 96.8 |

The analysis indicated that both the heating and the addition of the thioic acid effectively provide a purer dimethyl phosphorochloridothionate.

EXAMPLE 3

Four samples of distilled DMPCT were prepared as in Example 1 above, to determine the proper amount of dimethyl phosphorothioic acid (DMPTA) that is needed to purify dimethyl phosphorochloridothionate. Each of the samples were divided into 100 grams to which varying amounts of dimethyl phosphorothioic acid (DMPTA) were added. After heating each of the samples at about 50° C. for about 20 minutes, the samples were distilled and analyzed as follows:

|  | Percent DMPTA added | | | |
|---|---|---|---|---|
|  | 0 | 4.0 | 6.0 | 8.0 |
| Mole percent of components: | | | | |
| $S_2Cl_2$ | 2.73 | 0.04 | 0 | 0 |
| $CH_3OP(S)Cl_2$ | 1.64 | 1.39 | 1.32 | 1.34 |
| $CH_3(O)(CH_3S)POCl$ | 16.20 | 3.78 | 4.60 | 3.66 |
| Purity | 76.0 | 90.0 | 90.2 | 90.3 |

From the analysis, it is shown that the amount of thioic acid added in excess of 4% does not result in any significant difference of purification of the desired product. However, when there is no thioic acid added, there is a great discrepancy as to the purification of the thionate. That is, without any thioic acid the thionate was only 76% and with thioic acid, was at least 90%.

What is claimed is:

1. A process for the purification of a dialkyl phosphorochloridothionate which comprises:

(a) providing a mixture containing said phosphorochloridothionate and difficult to separate impurities containing sulfur, chlorine and phosphorous associated with the preparation of a dialkyl phosphorochloridothionate by the reaction of a chlorinating agent and a bis(thionophosphono)sulfide of the structure:

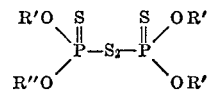

or a dithiophosphoro compound of the structure:

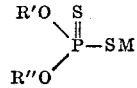

wherein R' and R" are alkyl containing from 1 to 12 carbon atoms, and M is hydrogen or alkali metal;

(b) admixing and reacting with said mixture for a period of at least one minute at a temperature between about 10° C. and 80° C. a sufficient amount of a dialkyl phosphorodithioic acid to react with at least one of the impurities therein to form more of the phosphorochloridothionate; and (c) separating and removing the phosphorochloridothionate in a substantially pure state from the impurities in the mixture, 2. A process according to claim 1, wherein the dialkyl phosphorodithioic acid is selected from the group consisting of dimethyl, diethyl, dipropyl, diisopropyl, dibutyl, di-iso-butyl, di-t-butyl, and dihexyl.

3. A process according to claim 1, wherein the dialkyl phosphorodithioic acid is reacted with said mixture containing said dialkyl phosphorochloridothionate for a period of about 1 minute to 1 hour.

4. A process according to claim 1, wherein said dialkyl phosphorodithioic acid is admixed in the amount of 1% to 20% with said dialkyl phosphorochloridothionate solution.

5. A process according to claim 1, wherein the dialkyl phosphorochloridothionate is selected from the group consisting of phosphorochloridothionates consisting of dimethyl, diethyl, dipropyl, diisopropyl, dibutyl, di-iso-butyl, di-t-butyl, and dihexyl.

6. A process according to claim 1, wherein the dialkyl phosphorochloridothionate produced has a purity of at least about 95.0%.

7. A process according to claim 1, wherein the impurities include $S_2Cl_2$, and phosphorous compounds having the formulas:

$$RO-\overset{O}{\underset{\|}{P}}-Cl_2 \quad \text{and} \quad (RO)(RS)\overset{O}{\underset{\|}{P}}-Cl$$

wherein R is an alkyl consisting of 1 to 12 carbon atoms.

8. A process according to claim 7, wherein said thioic acid reacts with $S_2Cl_2$ to form more of the phosphorochloridothionate.

References Cited
UNITED STATES PATENTS

| | | | |
|---|---|---|---|
| 3,089,890 | 5/1963 | Chupp et al. | 260—986 X |
| 2,900,406 | 8/1959 | Vogel et al. | 260—986 X |
| 3,502,750 | 3/1970 | Anglaret et al. | 260—990 X |

LEWIS GOTTS, Primary Examiner

R. L. RAYMOND, Assistant Examiner

U.S. Cl. X.R.

260—986

Notice of Adverse Decision in Interference

In Interference No. 100,185, involving Patent No. 3,794,703, T.M. Beck, R.J. Eletto and D.J. Martin, PROCESS FOR THE PURIFICATION OF DIALKYL PHOSPHOROCHLORIDOTHIONATES, final judgment adverse to the patentees was rendered Nov. 23, 1981, as to claims 1 and 2.

[*Official Gazette June 8, 1982.*]